United States Patent [19]
Friedman et al.

[11] Patent Number: 5,326,500
[45] Date of Patent: Jul. 5, 1994

[54] VERMICULITE COMPOSITION WITH IMPROVED CHEMICAL EXFOLIATION

[75] Inventors: Semyon D. Friedman, Baltimore, Md.; Robert W. McKinney, Palm Coast, Fla.; Chia-Chih Ou, Lexington, Mass.; Robert M. Spotnitz, Baltimore; Shaohai Wu, Ellicott City, both of Md.

[73] Assignee: W.R. Grace & Co.-Conn., New York, N.Y.

[21] Appl. No.: 76,664

[22] Filed: Jun. 14, 1993

[51] Int. Cl.⁵ .......................................... C04B 20/06
[52] U.S. Cl. ............................... 252/378 R; 106/675; 106/DIG. 3; 423/328.1
[58] Field of Search ................ 252/378 R; 106/675, 106/DIG. 3; 423/328.1

[56] References Cited

U.S. PATENT DOCUMENTS

| | | | |
|---|---|---|---|
| 1,972,390 | 9/1934 | Miner | 252/378 R |
| 3,325,340 | 6/1967 | Walker | 106/DIG. 3 |
| 3,758,415 | 9/1973 | Wada | 252/378 R |
| 4,269,628 | 5/1981 | Ballard et al. | 252/378 R |
| 4,324,838 | 4/1982 | Ballard et al. | 252/378 R |
| 4,539,046 | 9/1985 | McAloon et al. | 252/378 R |
| 4,801,403 | 1/1989 | Lu et al. | 252/378 R |
| 4,812,260 | 3/1989 | Nelson | 252/378 R |
| 4,818,435 | 4/1989 | Lukacs, III | 252/378 R |

Primary Examiner—Anthony Green
Attorney, Agent, or Firm—Howard J. Troffkin

[57] ABSTRACT

A vermiculite composition composed of particulate vermiculite mineral species having a density of 2.3 g/cm³ to 2.7 g/cm³ which has intercalated cations of lithium or organo ammonium and to dispersions obtained therefrom.

21 Claims, No Drawings

VERMICULITE COMPOSITION WITH IMPROVED CHEMICAL EXFOLIATION

BACKGROUND OF THE INVENTION

The invention described herein relates to a vermiculite composition having enhanced chemical exfoliation and ability to provide a high yield of single platelet material and to products formed therewith. Specifically, the present vermiculite composition is composed of particulate vermiculite mineral species having a density of 2.3 g/cm$^3$ to 2.7 g/cm$^3$ which has cations of lithium or organo ammonium intercalated between the mineral's platelet layers.

Vermiculite ore is composed of micaceous minerals, chemically identified as a hydrated magnesium-aluminum-iron silicates and characterized by a platelet structure which exfoliate or expand in a single direction when subjected to high temperatures or chemical treatments. The minerals occur naturally in an unexpanded state, and are mined in conventional manner.

The term vermiculite refers to mineral species characterized by a layer latticed structure in which the silicate layer units have a thickness of approximately 10 Å. The main elements present in the layer are magnesium, aluminum, silica and oxygen with the layers being separated by spacing of approximately 4Å which is occupied by sheets of water molecules associated predominantly with cations of as magnesium and calcium. The layers have considerable lateral extent relative to the thickness of the 10 Å platelet layer. The vermiculite minerals include minerals composed wholly or largely of vermiculite minerals or minerals of a mixed layer type containing vermiculite platelet layers as an important constituent, such as hydrobiotite, and chlorite-vermiculite.

The vermiculite ore, as mined, is associated with other minerals and undesirables. The crude vermiculite ore normally contains about 15 to 30 weight percent commercially desired vermiculite. This crude ore is beneficiated by various known surface chemistry techniques to separate the gangue from the expandable material. For example, the crude ore is normally washed with water to remove clays and other associated fines. The remaining material is subjected to screening (with optional prior crushing to reduce particle size) to separate sand, rock and other debris from the platelet materials which contain non-expandable minerals (mica, etc.) and expandable materials. These are separated by treating the material with a surfactant and subjecting it to flotation or wet concentrating table techniques to recover vermiculite ore concentrate. Conventional ore concentrate is generally composed of 85 to 99 weight percent expandable vermiculite minerals ore having a range of specific densities ranging from less than 1.9 g/cm$^3$ to over 3.0 g/cm$^3$, depending on its platelet configuration.

Vermiculite minerals are well known for their capacity to undergo expansion to several times original volume. The process of expanding vermiculite ore concentrate by heating is referred to as thermal exfoliation. This process is conventionally achieved by a continuous procedure in which vermiculite concentrate are fed into an expansion kiln or oven, heated rapidly to temperatures in the range of 1100° F. to 1900° F. and the resultant expanded vermiculite product removed from the heating zone as additional unexpanded material is introduced. Thermally exfoliated vermiculite is conventionally used as packing, thermal insulation, filler material and the like.

Vermiculite ore concentrate has also been caused to expand by osmotic swelling. The ore concentrate is initially subjected to an aqueous electrolytic solution, such as aqueous sodium chloride, and then immersed in water to cause swelling by osmotic pressure. U.S. Pat. No. 3,062,753 to Hayes utilizes a combination of osmotic swelling followed by thermal treatment to cause improved volume yield of vermiculite ore concentrate.

In recent time, the use of asbestos as a material which enhances thermal properties of materials has been found unsuitable because of health reasons. With the withdrawal of asbestos from use, the need has arisen for new materials to enhance the thermal and fire resistance of many products. High performance organic and inorganic materials, such as polyimides, aramides, graphite and ceramic substances have been developed to fill the void. In addition, vermiculite dispersions composed of delaminated vermiculite resulting from delamination of the mineral species, have provided the needed enhancement properties. Although conventional ore concentrate and thermally exfoliated material have limited applicability as a coating or filler material for this purpose, vermiculite dispersions can be readily formed into sheets or applied to woven and non-woven materials and other substrates to provide the desired properties.

U.S. Pat. No. 3,325,340 to Walker describes the production of dispersions of delaminated vermiculite and the production of films and coatings therefrom. The patent discloses that dispersions can be prepared by treating vermiculite minerals with a solution containing a cation which can diffuse between the interlayers of the mineral's structure and cause gross swelling in the direction normal to the main cleavage plane of the layer during immersion in water, immersing the treated vermiculite in water and permitting the swelling to occur, and shearing the swollen vermiculite to delaminate the layers and form a suspension of vermiculite flakes or platelets.

U.S. Pat. No. 3,325,340 discloses agents which can be used to promote the swelling of the vermiculite to be the chloride salts of the following cations: n-butylammonium; iso-amylammonium; isobutylammonium, n-propylammonium and the like; the cationic form of amino acids, such as lysine or ornithine, and the lithium cation. The focus of this patent is the ability of the disclosed cations to promote vermiculite swelling and delamination. The predominant material used are n-butylammonium chloride and lithium chloride salts. U.S. Pat. No. 4,812,260 to Nelson further used other organic ammonium salts, such as those of allylammonium, to promote swelling. The dispersions formed according to the processes of Walker and Nelson tended to be unstable, in that the vermiculite platelets tended to reaggregate and to settle out over a period of time. However, when the platelet dispersion contained certain anionic chelating agents, as taught in U.S. Pat. Nos. 4,655,842 and 5,102,464, the resultant suspension was found to be more stable.

One of the major drawbacks of the dispersions formed according to known processes is their lack of uniformity and the presence of platelet material which has not delaminated to a high degree. The vermiculite ore concentrate does not have a sufficiently high degree of delamination into single (or few) layer platelet material to substantially eliminate high multiple platelet material. This may be due to the incomplete swelling of the vermiculite mineral species and/or due to the lack of uniformity of the vermiculite ore used. The resultant dispersion, thus, contains agglomerated material which hinders the production of suitable treated or formed end product. For example, the coatings and sheets formed from the dispersions tend to be non-uniform.

It is an object of the present invention to provide a vermiculite composition which has enhanced osmotic swelling and delamination capabilities.

It is further object of the present invention to provide a process for forming substantially uniform vermiculite dispersions having a very high degree of single platelet material.

It is a further object of the present invention to provide sheet materials and coated materials using the present improved vermiculite dispersions.

SUMMARY OF THE INVENTION

The subject invention described and claimed is directed to a vermiculite composition having enhanced osmotic swelling and delamination capabilities, to aqueous dispersions formed with the resultant delaminated material and to products coated with or containing the delaminated material.

DETAILED DESCRIPTION

The present invention is directed to a vermiculite composition capable of exhibiting enhanced osmotic swelling and a very high yield of substantially uniform platelet material. The present composition can be used to form improved articles, such as fire/thermal resistant sheet products, gas barrier films, gaskets and the like.

The present vermiculite composition is composed of vermiculite mineral species having a specific density of from 2.3 $g/cm^3$ to 2.7 $g/cm^3$ and preferably from 2.3 $g/cm^3$ to 2.6 $g/cm^3$. Such mineral species normally makes up about 50 percent by weight of conventional ore concentrate. The vermiculite mineral species of the present composition have intercalated cations selected from lithium, alkylammonium or cationic amino acids in at least 30 milliequevalents per one hundred grams (meq/100 gm) of the vermiculite mineral and preferably from 50 to 150 meq/100 gm.

It has been unexpectedly found that the present vermiculite composition has enhanced osmotic swelling and resultant delamination capabilities. For example, lithium cations exchanged vermiculite composition of the present invention exhibits three to four fold swelling characteristics with respect to other lithium exchanged vermiculite minerals. The resultant platelets are of substantially uniform thickness and have an average diameter of about 20 to 40 $\mu m$ and an aspect ratio (diameter/thickness) of about 500:1 or greater. Very thin platelet material is achievable by the present invention with aspect ratios of 1,000:1 and greater.

The crude vermiculite ore is normally mined by open pit mining. In the mining process, the ore is collected in combination with other minerals, common dirt and the like. This crude material is beneficiated by known methods to remove gangue material. The separated vermiculite ore concentrate is made up of a number of mineral species having a spectrum of specific densities. Normally, the recovered vermiculite ore concentrate is composed of materials having a density ranging from about 1.9 to over 3.0 $g/cm^3$.

The crude vermiculite ore is beneficiated in conventional manners, as described above and well known to those skilled in this art. Such beneficiating procedures use surface chemistry phenomena to separate the expandable vermiculite minerals from the non-expandable material collected with it during mining. Beneficiating produces an ore concentrate which is conventionally composed of about 85 weight percent or more of a variety of heat expandable vermiculite minerals.

In forming the present composition, vermiculite ore concentrate must be further purified to remove a substantial portion of the vermiculite mineral species and gangue material contained in the concentrate. This further purification is directed to separating vermiculite mineral species having specific density of from 2.4 to 2.7 $g/cm^3$ from the remaining mineral species of the ore concentrate.

The required purification can be done by density classification techniques. For example, density classification can be done by the use of various liquid medias. Low density material can be removed by mixing the ore concentrate with a liquid media having a desired low density cut-off value, such as a density of 2.4 $g/cm^3$. All of the material which floats is removed from the resultant slurry. The remaining solids are removed and collected from the liquid media by filtration or the like. The collected solids are then made into a second slurry with a fluid or liquid media having a desired high density cut-off value, such as a density of 2.7 $g/cm^3$ (preferably 2.6 $g/cm^3$) to remove the particulate material from the vermiculite minerals having higher density than required to provide a composition of the present invention. Here, the material which floats on the liquid media is collected.

The appropriate density classification liquid can be formed from a single liquid having the appropriate density or from a mixture of miscible liquids of different specific densities. For example, mixtures of liquids composed of tribromoethanediol (density of 2.57 $g/cm^3$); tribromomethane (2.9); dibromomethane (2.5); perchloroethylene (1.2); naphtha (1.6); toluene (1.6); methylene bromide (2.1); tetrachloroethane (2.1); dibromoethane (2.6); tetrabromoethane (2.95); and tetrabromomethane (3.42) and the like can be formed in ratios to provide the desired specific density.

The density separation can also be conducted by heavy media separation using colloidal suspensions of finely divided, heavy particles in water as a pseudo-fluid. Various solid particles have been used to form heavy media colloidal suspensions including quartz, barite, loess, gypsum and pyrite, magnetite, galena, ferrosilicon and the like. Ferrosilicons are preferred materials because of their ability to make sharp separations at varying densities, as required by the present invention, by varying the ratio of water to ferrosilicon; the ability to readily remove the sink product continuously; and low cost of material and operation. Heavy media separation techniques are discussed in Society of Mining Engineers Mineral Processing Handbook, Vol. 1, Section 4, Chapter 2, (1985) Editor-in-Chief, N. L. Weiss.

Still another method of separating out the desired material is to first wash the ore concentrate free of any surfactant material which may have been added during conventional beneficiation. The washed material is then processed to provide a substantially uniform particle size material which can then be separated into density fractions using a shaking table sorting apparatus.

The undesired material from each densification step can be collected and used as low-end material, such as filler, packing, etc. where osmotic swelling and platelet retrieval are not critical.

The present composition is formed by utilizing the vermiculite ore concentrate material having a specific density of from 2.3 g/cm$^3$ to 2.7 g/cm$^3$, should be composed of at least 85%, preferably at least 90% and most preferably at least 95% by weight of vermiculite mineral species having the required specific density, should have a cation exchange capacity of at least 30 meg/100 gm vermiculite mineral and should have exchangeable cations of the mineral species replaced by lithium, a $C_2$–$C_6$ alkyl ammonium cation, an allyl ammonium cation or a cationic amino $C_3$–$C_6$ alkyl carboxylic acid.

The cation exchange is accomplished by known manners, such as by contacting the mineral species with an aqueous solution of a water soluble salt of the desired cation. Of all of the cations previously used to treat vermiculite, only certain cations provide the desired result when used in forming the present composition. These cations are lithium, ($C_2$–$C_6$ alkyl) ammonium, allyl ammonium, or cationic ammonium carboxylic acids. The preferred cations are lithium and n-butyl ammonium. The anion of the salts can be any anion of an inorganic or organic acid provided the salt is water soluble such as chloride, carbonate, citrate, acetate, ethylene diamine tetraacitic acid and the like. The preferred anions are anionic chelants, such as citrate anion and ethylene diamine tetraacetic acid.

The present invention is further directed to utilizing the subject vermiculite composition to form an aqueous vermiculite colloidal dispersion having a very high degree of single and low aggregate platelet vermiculite material. The vermiculite platelet materials of these dispersions are excellent film formers binder material, or coating material. Uniform films can be cast from the dispersion using conventional techniques, such as a single draw down gauge and a flat surface. The films can be thin, without aggregate platelet defects and exhibit high tensile strengths of about 10,000 psi. Further, the subject dispersion is formed of vermiculite platelets which exhibit high affinity for glass fiber and organic (e.g. cellulosic) fibers. Woven and non-woven sheets made with these fibers in which the vermiculite platelets are used as filler exhibit enhanced thermal and fire resistance. The platelet dispersion can also be used as a coating material which provide uniform coating, extended coating capacity and does not exhibit aggregate defects.

Thus, vermiculite dispersions may be prepared by the prior art method involving cation exchange, swell, and delamination, if it is further provided that the vermiculite mineral species employed is of the specific density vermiculite composition described above.

This invention is accordingly directed in part to a method comprising the steps of treating vermiculite minerals particles of the specified density with a cation which promotes swelling of the mineral in a direction normal to the main cleavage plane of the minerals during immersion in water subsequent to said treatment; immersing the treated minerals in water; permitting the immersed minerals while immersed in water to a shearing force to form a dispersion of vermiculite platelets.

The process of forming the subject dispersion requires the use of beneficiated and density classified vermiculite mineral composition, as described above. This composition can be treated with water soluble cation as described in U.S. Pat. No. 3,325,340 and preferably, with water soluble anionic chelating agents, as described in U.S. Pat. Nos. 4,655,842 and 5,102,464. The teachings of U.S. Pat. Nos. 3,325,340, 4,655,842, and 5,102,464 are incorporated herein by reference. The cation exchange is provided by contacting the vermiculite with the cation containing aqueous media for about 2 to 24 hours. Longer or shorter times may be appropriate depending on the temperature and volume conditions.

After completion of the treatment step, the ore is separated from the bulk of the treatment bath, e.g. by filtration or decantation. The treated ore is then immersed in water which is substantially free of electrolyte so as to create an electrolyte concentration gradient between the interior of the vermiculite ore particles and the surrounding medium. This gradient is believed to generate osmotic pressures which cause separation or partial delamination of the individual layers of the vermiculite and overall swelling of the ore particle.

Generally, the treated vermiculite particles are immersed in water for about 5 to 15 minutes at room temperature, the water decanted, and a quantity of fresh water added, and this process is repeated several times to achieve maximum swelling and the removal of substantially all of the ions in solution.

When the cation exchange is conducted using allyl ammonium cations, the treated vermiculite material of the present invention may be directly delaminated, as described below, without contacting the material with electrolyte free water.

The present vermiculite composition provides exceptional enhanced swelling characteristics and highly effective delamination into uniform platelets. The present composition has the capability of swelling several fold greater than compositions (treated with same cation) which are outside of the present invention. This extended swelling provides for the ready delamination of the material into substantially uniform thin platelet material.

Subsequent to swelling, the final rinse bath is separated from the vermiculite and sufficient water is added to bring the vermiculite solids concentration to a desired level. The concentration may also be adjusted by addition or removal of water after delamination. Although the dispersions can be prepared to a vermiculite solids weight concentration of up to 20%, concentrations of less than 15% are normally preferred in order to attain a sufficient low viscosity permitting easy handling and use. Weight concentrations in the range of about 4% to 12% are preferred, more preferably about 5% to 10%.

The delamination of the treated vermiculite may be effected by the conventional means of high speed shearing which have been previously used, e.g., colloid mills, high speed blenders, homogenizers, and the like. The resultant dispersion of particulate material has a high degree of low aggregate material. For certain applications, it may be preferred to further eliminate any residual particulate having undesirable particle size diameter, such as greater than about 50 microns. This can be done by filtration and the like.

Although prior processes have yielded dispersions with varying properties depending on the source of the vermiculite ore, the present process provide constant high quality dispersion without regard from where the ore was mined.

The dispersions of this invention can be used in any application for which vermiculite dispersions in general have been known. The dispersions can be used in the making of non-burning papers, e.g., as disclosed in U.S. Pat. Nos. 3,434,917 and 3,654,073 and in the published report of the Closed Systems Division of the National Aeronautic and Space Administration entitled "Development of Inorganic Nonflammable Vermiculite Flight Paper", Contract NAS 9-7882, published in 1969. The dispersions of this invention can also be used to form fireproofing coatings on combustible materials such as cellulose fibers, as disclosed for example, in U.S. Pat. No. 3,540,892, and to upgrade the fire and heat resistant of non-combustible fibers e.g. as in U.S. Pat. No. 3,654,073. The dispersions can also be cast as self-supporting films or to form coatings on such substrates as foams, metals, and plastic sheets.

The present invention is further described by the following examples, which are illustrative only and not intended to be of limiting effect. All parts and percentages are by weight unless otherwise stated.

EXAMPLE 1

This example illustrates the process of separating vermiculite by density fractions. A vermiculite ore concentrate obtained by conventional beneficiation was classified by specific density using heavy liquid separation. The vermiculite was mixed with a heavy liquid. Some of the vermiculite floated while the rest sank. The fraction that sank was denser than the liquid while the fraction that floated was less dense. The sink fraction was recovered and further separated using a denser liquid. Liquid mixtures of methylene bromide (2.10 g/cm$^3$), dibromoethane (2.6) and tetrabromoethane (2.95) were used to prepare solutions with specific gravities in the range of 2.3 to 2.9. Using these solutions, the vermiculite ore concentrate was classified into six fractions. Combined material having density of from 2.3 g/cm$^3$ to 2.7 g/cm$^3$ was 54.6 weight percent of the initial vermiculite ore concentrate used. 24.4 weight percent of the initial vermiculite concentrate had a specific density of 2.4 to 2.6 g/cm$^3$.

EXAMPLE 2

This example demonstrates that high yields of vermiculite dispersion and swelling volumes can be obtained by using certain density fractions obtained in the same manner as described in Example 1. The following procedure was used for preparing vermiculite dispersions. 10 parts of vermiculite was combined with 50 parts of 1.5 Normal solution of lithium citrate and mixed with constant agitation for three hours to effect ion exchange. The ion exchanged vermiculite was filtered off and rinsed repeatedly with deionized water until of the rinse water was less than 200 micromho/cm. The rinsed vermiculite was transferred to a 1-liter graduated cylinder and filled to the 600 ml mark with deionized water. The mixtures were shaken and allowed to stand for thirty minutes. The volume to which the swollen vermiculite filled the cylinder was recorded as the 'swelling volume'.

The swollen vermiculite was transferred to a one liter blender and sheered at a low speed for five minutes. The resultant vermiculite dispersion was transferred to a one-liter graduated cylinder and filled to the 1-liter mark with deionized water and mixed well. This mixture was allowed to stand for 20 hours and the non-exfoliated materials could settle. The "dispersion yield" is the amount of vermiculite in suspension relative to ten grams of vermiculite used in the ion exchange reaction above.

The suspended vermiculite dispersion containing approximately 0.4 wt. % solids was further concentrated by centrifugation to about 7.5 wt. % solids. This concentrated dispersion was cast into film by drawing the dispersion down on a granite surface using a draw down bar set at 25 mil. The quality of the film corresponding to each density fraction was judged by the grittiness of the film. Among the films tested, the 2.5-2.6 fraction was of the best quality, followed by the 2.6-2.7 and then by 2.7-2.8. All provided a substantially uniform sheets which were superior to sheets formed from conventional vermiculite concentrate generated material.

Table 1 lists the swelling volume and dispersion yields of different density fractions. Both the swelling volume and dispersion yield of density fractions in the range of 2.3 to 2.7 g/cm$^3$ are significantly higher than those of less that 2.3 and higher than 2.7 g/cm$^3$.

TABLE I

| Concentrate Fractions, g/cm$^3$ | Swelling Volume ml | Dispersion Yield % |
| --- | --- | --- |
| <2.3 | 120 | 31 |
| 2.3 to 2.4 | 570 | 41 |
| 2.4 to 2.5 | 590 | 65 |
| 2.5 to 2.6 | 560 | 42 |
| 2.6 to 2.7 | 330 | 48 |
| 2.7 to 2.8 | 94 | 30 |

EXAMPLE 3

The process described above in Example 2 was repeated using a 100 parts of 5 Normal solution of lithium chloride in place of the lithium citrate solution. The swelling volumes of various density fractions are provided in Table 2 below. The swelling volumes in the range of 2.3 to 2.7 g/cm$^3$ are significantly higher than those of less than 2.3 or higher than 2.7 g/cm$^3$.

TABLE 2

| CONCENTRATE FRACTIONS, g/cm$^3$ | SWELLING VOLUME ml |
| --- | --- |
| <2.3 | 130 |
| 2.3 to 2.4 | 550 |
| 2.4 to 2.5 | 580 |
| 2.5 to 2.6 | 585 |
| 2.6 to 2.7 | 520 |
| 2.7 to 2.8 | 92 |

What is claimed:

1. A vermiculite composition comprising a vermiculite ore concentrate material having at least 85% of at least one vermiculite mineral specie or mixture thereof having a specific density in the range of from 2.3 g/cm$^3$ to 2.7 g/cm$^3$ and at least 30 meq/100 gm of the vermiculite mineral specie of intercalated cations selected from the group consisting of lithium, (C$_2$-C$_6$ alkyl) ammonium, allylammonium, or ammonium C$_3$-C$_6$ alkyl carboxylic acid.

2. The composition of claim 1 wherein the intercalated cation is selected from lithium.

3. The composition of claim 1 wherein the intercalated cation is present in from about 50 to 150 meq./100 gm of vermiculite.

4. A process for preparing a vermiculite dispersion comprising
   a) separating vermiculite mineral material having a specific density within the range of from 2.3 g/cm$^3$ to 2.7 g/cm$^3$ from previously formed vermiculite ore concentrate;

b) treating said separated vermiculite mineral material with a cation exchange salt having a cation selected from the group consisting of lithium, ($C_2$–$C_6$ alkyl) ammonium, allyl ammonium, or ammonium ($C_3$–$C_6$ alkyl) carboxylic acid to cause said cation to be intercalated in the vermiculite mineral material;

c) immersing the treated vermiculite mineral material in water substantially free of electrolyte;

d) permitting the immersed vermiculite mineral material to swell in a direction normal to a main cleavage plane thereof to form swollen vermiculite minerals material; and e) subjecting the resultant swollen vermiculite mineral material while immersed in water to a shearing force to delaminate the vermiculite mineral material; and f) forming an aqueous substantially uniform suspension of delaminated vermiculite platelets.

5. The process of claim 4 wherein the cation exchange salt is a salt of citric acid.

6. The process of claim 4 wherein the vermiculite material is contacted with an aqueous treatment solution containing both citric acid or a soluble salt of citric acid and a soluble non-citrate cation exchange salt of the selected cation.

7. The process of claim 4 wherein the cation is selected from lithium or n-butyl ammonium.

8. The process of claim 5 wherein the cation is selected from lithium or n-butyl ammonium.

9. The process of claim 6 wherein the cation is selected from lithium or n-butyl ammonium.

10. The process of claim 4 wherein the suspension of step (f) further contains an anionic chelating agent in effective amount to enhance dispersion of the vermiculite platelets.

11. The process of claim 4 wherein the separated vermiculite material is composed of at least 90% vermiculite mineral having a specific density of from 2.3 $g/cm^3$ to 2.6 $g/cm^3$.

12. The process of claim 4 wherein the separated vermiculite mineral material is treated with cation exchange salt to cause the vermiculite to have at least 30 meq./100 gm of cation intercalated therein.

13. The process of claim 7 wherein the separated vermiculite mineral material is treated with cation exchange salt to cause the vermiculite to have at least 30 meq./100 gm of cation intercalated therein.

14. A vermiculite product comprising a substantially uniform colloidal dispersion of delaminated vermiculite platelets formed according to the process of claim 4.

15. A vermiculite product comprising a substantially uniform colloidal dispersion of delaminated vermiculite platelets formed according to the process of claim 5.

16. A vermiculite product comprising a substantially uniform colloidal dispersion of delaminated vermiculite platelets formed according to the process of claim 6.

17. A vermiculite product comprising a substantially uniform colloidal dispersion of delaminated vermiculite platelets formed according to the process of claim 7.

18. A vermiculite product comprising a substantially uniform colloidal dispersion of delaminated vermiculite platelets formed according to the process of claim 8.

19. A vermiculite product comprising a substantially uniform colloidal dispersion of delaminated vermiculite platelets formed according to the process of claim 9.

20. A vermiculite product comprising a substantially uniform colloidal dispersion of delaminated vermiculite platelets formed according to the process of claim 10.

21. A process for preparing a vermiculite dispersion containing a) separating vermiculite mineral material having a specific density within the range of from 2.3 $g/cm^3$ to 2.7 $g/cm^3$ from previously formed vermiculite ore concentrate;

b) treating said separated vermiculite mineral material with an aqueous composition of a salt having allyl ammonium cations to cause said cations to be intercalated in the vermiculite in at least 30 meq/100 gm of said vermiculite mineral material;

c) subjecting the aqueous composition containing the treated vermiculite mineral material to a shearing force to delaminate the vermiculite mineral material; and d) forming an aqueous, substantially uniform suspension of delaminated vermiculite platelets having an aspect ratio of at least 500:1.

* * * * *